United States Patent
Kang et al.

(10) Patent No.: US 6,292,355 B1
(45) Date of Patent: Sep. 18, 2001

(54) SRTIO$_3$-BASED GRAIN BOUNDARY BARRIER LAYER CAPACITOR

(75) Inventors: Suk-Joong L. Kang; Sang Yoon Koo; Joo Sun Kim, all of Taejeon (KR)

(73) Assignee: Korea Advanced Institute of Science and Technology (Kaist), Taejeon (KR)

(*) Notice: Subject to any disclaimer, the term of this patent is extended or adjusted under 35 U.S.C. 154(b) by 0 days.

(21) Appl. No.: 09/348,625

(22) Filed: Jul. 6, 1999

(51) Int. Cl.$^7$ .............................. H01G 4/06; C04B 35/46; C04B 35/48; C04B 35/49
(52) U.S. Cl. ................................ 361/321.5; 361/321.2; 501/136
(58) Field of Search ............................. 501/136; 361/311, 361/312, 320, 321.1–321.5, 301.2

(56) References Cited

U.S. PATENT DOCUMENTS 3,933,668 * 1/1976 Takahashi et al. ................. 501/136
5,039,452 * 8/1991 Thompson et al. ............. 252/519.51
5,580,506 * 12/1996 Kang et al. .......................... 264/615

* cited by examiner

Primary Examiner—Dean A. Reichard
Assistant Examiner—Eric W. Thomas
(74) Attorney, Agent, or Firm—Birch, Stewart, Kolasch & Birch, LLP

(57) ABSTRACT

Disclosed is an SrTiO$_3$-based grain boundary barrier layer capacitor which is superb in dielectric constant and temperature characteristics. It is prepared by infiltrating a liquid-phase oxide mixture into a donor-doped SrTiO$_3$ matrix to form second-phase dielectric layers at the grain boundaries of the matrix. The liquid-phase oxide mixture comprises CaO and BaO in a particular molar ratio. The SrTiO$_3$-based grain boundary barrier capacitor exhibits a high dielectric constant and a low dieletric loss with stable temperature characteristics.

2 Claims, 3 Drawing Sheets

SRTIO₃-BASED GRAIN BOUNDARY BARRIER LAYER CAPACITOR

BACKGROUND OF THE INVENTION

1. Field of the Invention

The present invention relates to an $SrTiO_3$-based capacitor which has a high dielectric constant with stable temperature characteristics. More particularly, the present invention relates to the use of BaO and CaO as an oxide liquid infiltrant for the formation of second-phase dielectric layers at the grain boundaries of an $SrTiO_3$-based grain boundary barrier layer capacitor (hereinafter referred to as "GBBLC").

2. Description of the Prior Art

GBBLCs exhibit by high dielectric constants which result from their specific microstructure of thin dielectric layers between semiconducting grains. The preparation of GBBLCs is well known, as reported by M. Fujimoto and W. D. Kingery ("Microstructure of $SrTiO_3$ internal Boundary Layer Capacitors During and After Processing and Resultant Electrical Properties", J. Am. Ceram. Soc., 68[4] 169–173 (1985)), and G. Goodman ("Capacitors Based on Ceramic Grain Boundary Barrier Layer—a Review", Advanced in Ceramics, vol 1, Grain Boundary Phenomena in Electronic Ceramics, 215–231 (1981)). According to these reports, GBBLCs are prepared via two process steps: i) preparation of semiconducting sintered bodies and ii) infiltration of an oxide liquid into the sintered bodies to form dielectric layers at grain boundaries. For the preparation of semiconducting sintered bodies, donor dopants are usually added to SrTiO3 powder compacts and the donor-added $SrTiO_3$ compacts are sintered in a reducing atmosphere. The infiltration of an oxide melt in an oxidizing atmosphere then produces dielectric layers at grain boundaries of the semiconducting $SrTiO_3$ grains. The infiltrants for GBBLCs in current use include mostly low melting point oxides, such as PbO, $B_2O_3$, $Bi_2O_3$, CuO, etc [Takahashi Yasunori, Yamaoka Nobutatsu, Yamaoka Yoshifumi, Kakubari; Shuichi, "Intergranular insulation type polycrystalline ceramic semiconductive composition", U.S. Pat. No. 3,933,668, Nobutatsu Yamaoka, "$SrTiO_3$-Based Boundary-Layer Capacitors", Am. Ceram. Soc. Bull., 62[8], 1149–1152(1986)].

The dielectric property of the thus prepared $SrTiO_3$-based GBBLCs is known to be determined by the infiltrant chemistry and the infiltrated microstructure. According to R. Wernicke ("Two-layer Model explaining the Properties of $SrTiO_3$ Boundary layer Capacitors", Advances in Ceramics, vol. 1, Grain Boundary Phenomena in Electronic Ceramics, 272–281, 1981), the dielectric constant of $SrTiO_3$-based GBBLCs increases with an increase in the $SrTiO_3$ grain size and with a decrease in the thicknesses of an infiltrated oxide liquid phase and an oxidized layer formed during the liquid infiltration. In addition, the higher dielectric constant of the dielectric layer formed between $SrTiO_3$ grains, the higher is the dielectric constant of the fabricated $SrTiO_3$-based GBBLC.

SUMMARY OF INVENTION

With this background in mind, the present inventors repeated intensive and thorough research on $SrTiO_3$-GBBLCs and found that BaO and CaO are effective in increasing the dielectric constant of the $SrTiO_3$-based GBBLCs. According to the present invention, the infiltration of a conventional oxide liquid phase in combination with a mixture of BaO and CaO into the boundaries of $SrTiO_3$ grains results in a higher dielectric constant of the $SrTiO_3$-based GBBLC with stable temperature characteristics than the infiltration of a conventional oxide liquid phase without BaO and CaO.

Therefore, it is an object of the present invention to provide an $SrTiO_3$-based GBBLC which is superior in both dielectric constant and temperature characteristics.

In accordance with the present invention, the above and other objects could be accomplished by infiltrating an oxide melt, which comprises BaO and CaO, into an $SrTiO_3$sintered body. The BaO and CaO may be provided from a BaO precursor and a CaO precursor.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1A:
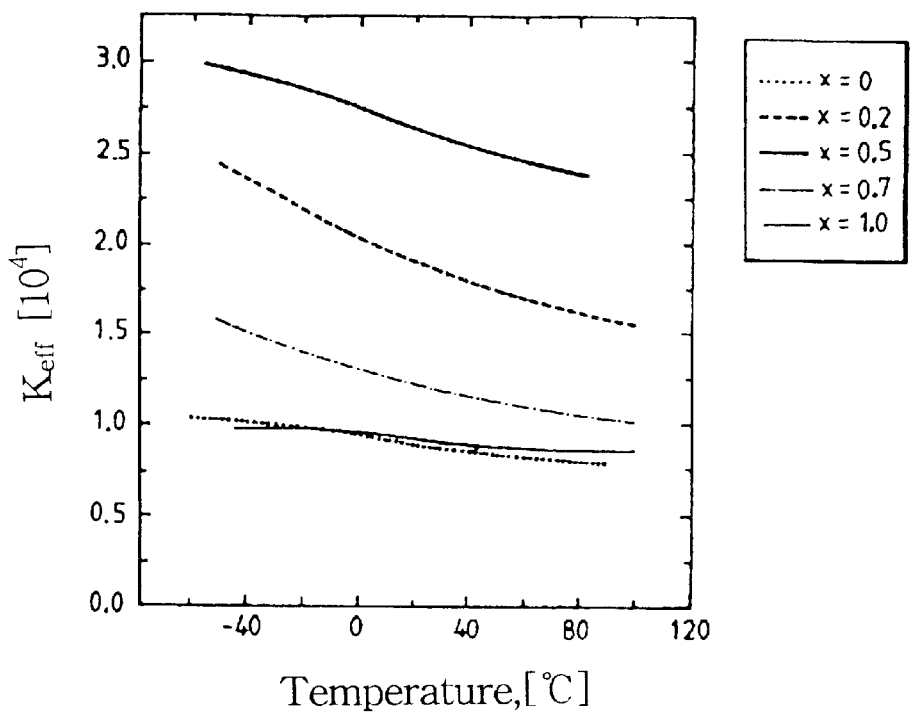
FIG. 1a is a graph in which the dielectric constant values of the $SrTiO_3$-GBBLCs are plotted against temperature for various molar ratios of BaO and CaO.

In the present invention, $SrTiO_3$-based GBBLCs are prepared by producing sintered $SrTiO_3$ bodies; producing oxide mixtures comprising BaO, CaO or a combination thereof, which liquefy at high temperatures; and infiltrating the liquid phase-formative oxide mixtures into the sintered $SrTiO_3$ bodies. Compared with the conventional technique, the present invention is characterized by the existence of BaO and CaO in an oxide mixture for infiltration.

In detail, in order to prepare the $SrTiO_3$-based GBBLC of the present invention, first, an $SrTiO_3$ powder is mixed with a donor powder, such as $Nb_2O_5$ or $La_2O_3$, and this mixture is subjected to cold pressing to form a predetermined shape. Then, the powder compact is sintered at 1,400° C. or higher for several hours in a reducing atmosphere, for example $95N_{2-5}H_2$.

Separately, precursor materials for BaO and CaO, which can be converted into BaO and CaO at high temperatures, for example $BaCO_3$ and $CaCO_3$, are mixed at a predetermined molar ratio with ordinary liquid phase-formative oxide materials.

Finally, this liquid phase-formative oxide mixture thus prepared is infiltrated into the grain boundaries of the sintered $SrTiO_3$ bodies. In contrast to the sintering process, this infiltrating process is conducted in an oxidizing atmosphere. As aforementioned, the present invention is characterized by use of BaO and CaO together with an ordinary oxide mixture for infiltration in forming a dielectric layer. The use of BaO and CaO in forming the dielectric layer enjoys the following advantages:

First, upon infiltration, the BaO in the liquid phase-formative oxide mixture is expected to react with $TiO_2$, which exists at the grain boundaries of the sintered body, to form a $BaTiO_3$ phase, having a high dielectric constant, at the grain boundaries.

Second, $BaTiO_3$, which is ferroelectric at room temperature, and exhibits an increase in dielectric constant with temperature increase, can serve to compensate the temperature characteristics of $SrTiO_3$, whose dielectric constant decreases with a temperature increase. Therefore, the resultant GBBLC can have stable temperature characteristics, showing that its dielectric constant is not greatly modulated with temperature.

Third, CaO in the liquid phase-formative oxide mixture buffers the microstructure change which may be caused by the presence of BaO. Hence, the addition of CaO together with BaO is essential in the present invention.

A better understanding of the present invention may be obtained in light of the following examples. In the examples, in order to confirm the improvement in dielectric constant and temperature characteristics by virtue of the existence of BaO and CaO in the infiltrant liquid phase, $BaCO_3$ and $CaCO_3$ were used as precursors for BaO and CaO, respectively, while $Bi_2O_3$ was selected as the base of the infiltrant liquid phase. However, other oxides which are usually used for conventional $SrTiO_3$-based GBBLCs, such as PbO, CuO and $B_2O_3$ may be used together with any precursors which provide CaO and BaO at liquid phase infiltrating temperatures. Therefore, the examples are set forth to illustrate but not limit the present invention.

EXAMPLE I

To $SrTiO_3$ powder was added 0.2 mol % of $Nb_2O_5$, a donor, and the mixture was sintered at 1,480° C. for 5 hours. To $Bi_2O_3$, which is a liquid phase-formative oxide at an infiltrating temperature, was added $BaCO_3$ and $CaCO_3$ at molar ratios as indicated in Table 1, below.

TABLE 1

| X* | CaO:BaO (mole ratio) | Composition (mole ratio) |
|---|---|---|
|  | 0:0 | $1Bi_2O_3$ |
| 0 | 0:1 | $0.8Bi_2O_3$-0.2CaO |
| 0.2 | 0.2:0.8 | $0.8Bi_2O_3$-0.04CaO-0.16BaO |
| 0.5 | 0.5:0.5 | $0.8Bi_2O_3$-0.1CaO-0.1BaO |
| 0.7 | 0.7:0.3 | $0.8Bi_2O_3$-0.14CaO-0.06BaO |
| 1.0 | 1:0 | $0.8Bi_2O_3$-0.2BaO |

*mole fraction of CaO in a mixture of CaO and BaO

The mixed powders thus obtained were slurried, uniformly coated on the polished surfaces of the sintered specimens, and infiltrated into the sintered specimens for 4hours at 1,300° C., a temperature at which the oxides are a liquid phase. After completion of the infiltration, the opposite surfaces of the specimens were polished to the extent that they had a final thickness of 500 m.

An examination was made for the dielectric properties and the temperature dependency of the dielectric constant of the $SrTiO_3$-based GBBLCs thus obtained. For this, silver was thinly coated on both surfaces of the infiltrated specimens. The silver-coated specimens were then heat-treated at 600° C. for 10 min. After cooling the specimens with liquid nitrogen, their dielectric constant and its variation with temperature were measured while increasing measurement temperature. The results are shown in FIGS. 1 and 2.

Figure 1B:
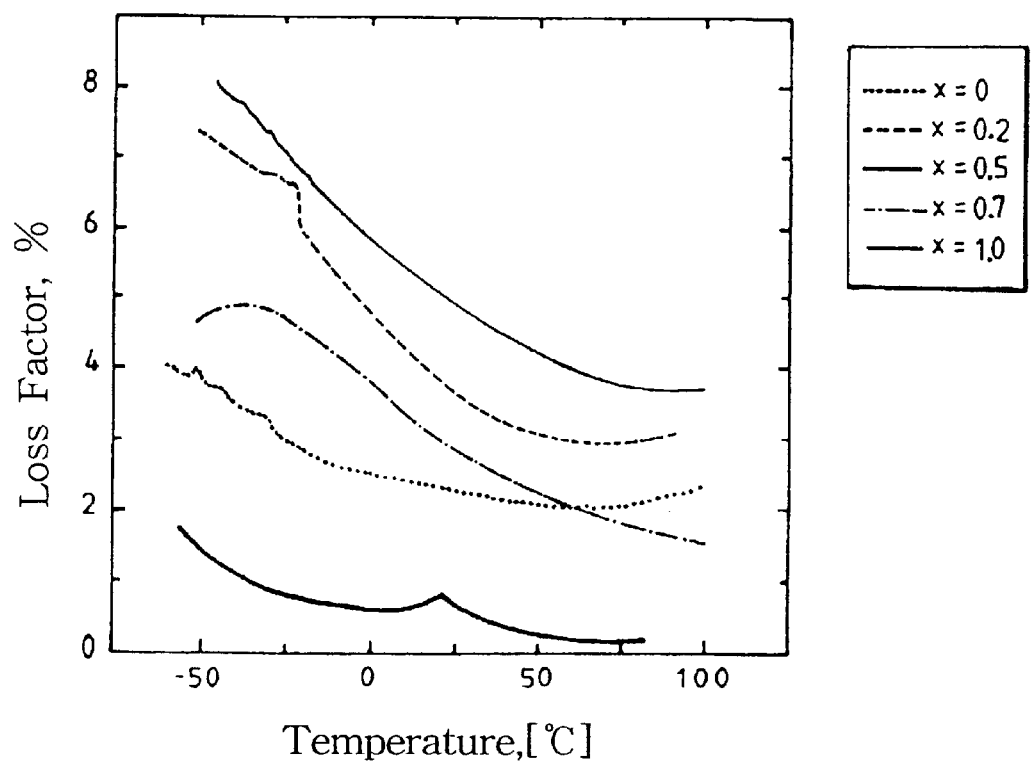
FIG. 1b is a graph in which the dielectric loss values of the $SrTiO_3$-GBBLCs are plotted against temperature for various molar ratios of BaO and CaO.

FIGS. 1a and 1b show the change of the dielectric constant and dielectric loss as a function of temperature. As shown in FIGS. 1a and 1b, the highest dielectric constant and the lowest dielectric loss are obtained when BaO and CaO exist at an equal mole (x=0.5) in the liquid phase-formative oxide mixture. On the other hand, when x=0 and 1.0, the lowest dielectric constant and the highest dielectric loss are detected. Numerically, at room temperature, the GBBLC has a dielectric constant of $2.8 \times 10^4$ for x=0.5 and a dielectric constant of $1.0 \times 10^4$ for x=1.0 and 0. As for the dielectric loss above room temperature, it is as low as 1% or less for x=0.5, but 3 to 5% for x=0 and 1.0. Consequently, better dielectric and dielectric loss values can be obtained when using both CaO and BaO than when using only CaO or BaO.

Figure 2A:
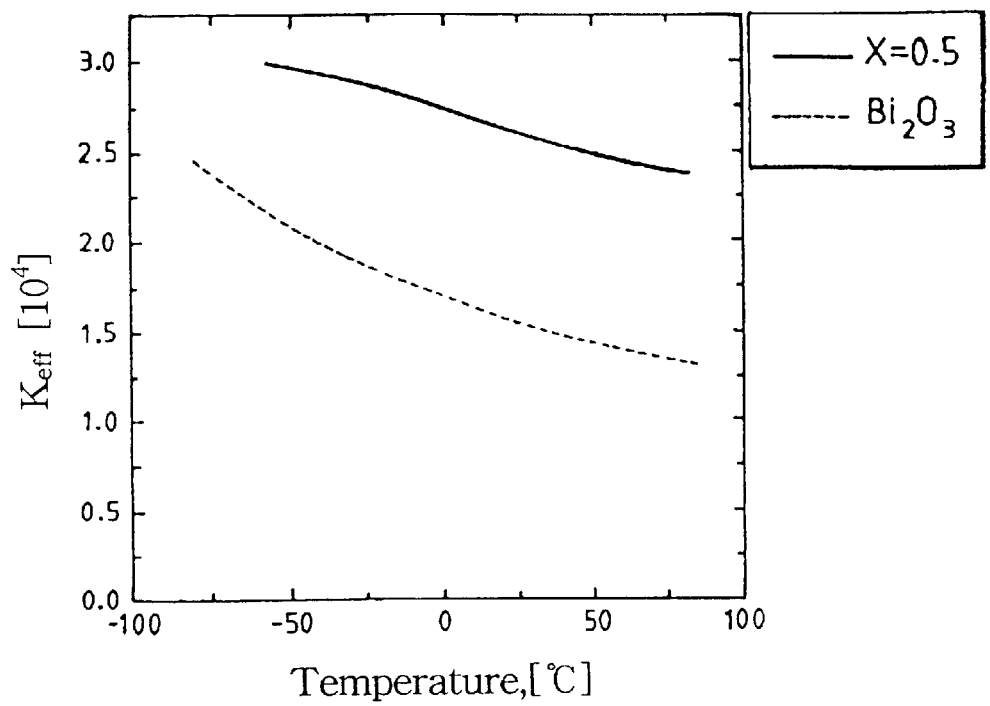
FIG. 2a is a graph which shows the variations of dielectric constant values with temperature for $SrTiO_3$-GBBLCs infiltrated with $Bi_2O_3$ along and with $Bi_2O_3$ together with BaO and CaO of equal molar ratio.
Figure 2B:
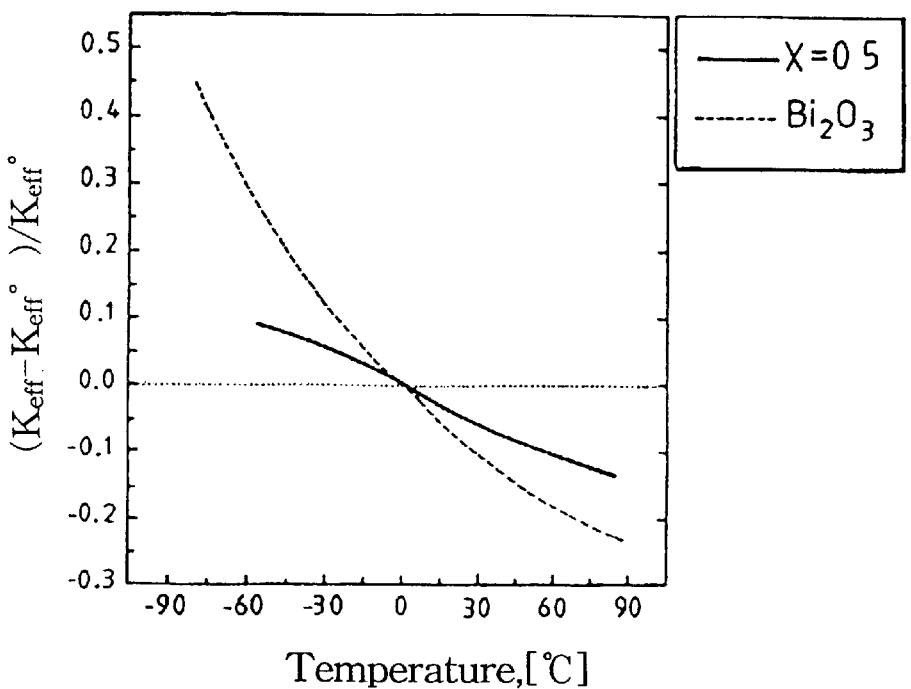
FIG. 2b is a graph showing the relative change in dielectric constant values of the $SrTiO_3$-based GBBLCs of FIG. 2a, based on the values at 0° C.

With reference to FIG. 2, the changes of dielectric constant with temperature are compared between $SrTiO_3$-based GBBLCs infiltrated with $Bi_2O_3$ alone and with equal moles of BaO and CaO together with $Bi_2O_3$. As plotted in FIG. 2a, higher dielectric constant values are obtained when BaO and CaO are used together with $Bi_2O_3$ than when only $Bi_2O_3$ is used. The data in FIG. 2b demonstrate that the infiltration of BaO and CaO into the $SrTiO_3$ grain boundaries allows high stability of dielectric constant of the GBBLC with respect to temperature. When x=0.5, the dielectric constant varies only within ±10% over the tested temperature range between −60° C. and 60° C. This variation is about a half of the variation of the specimens infiltrated with $Bi_2O_3$ only.

EXAMPLE II

Figure 3A:
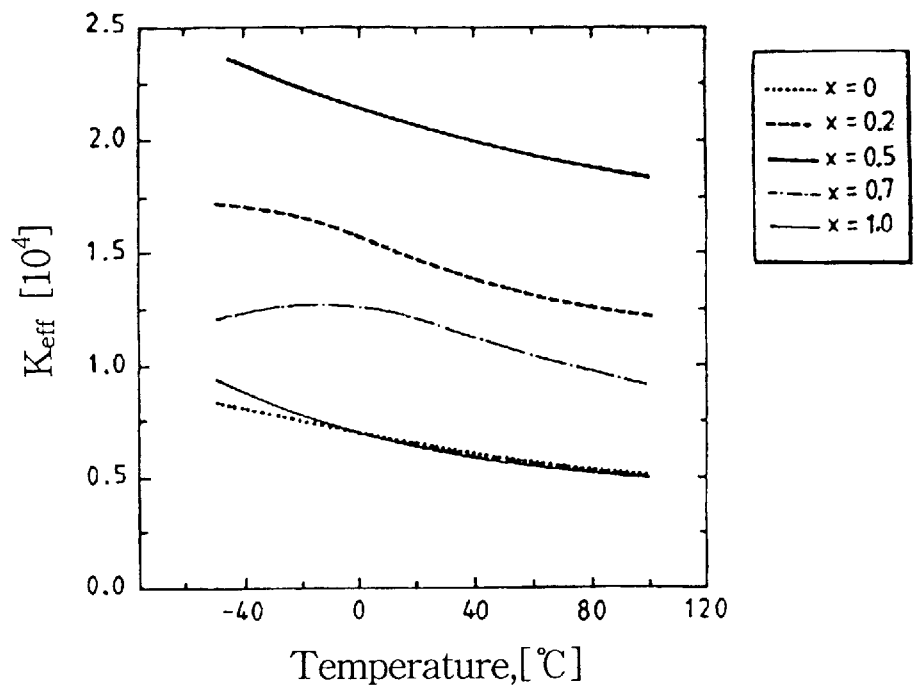
FIG. 3a is a graph in which the dielectric constant values of the $SrTiO_3$-based GBBLCs are plotted against temperature for various molar ratios of BaO and CaO when the infiltration treatment is conducted at 1,300° C. for 8 hours.
Figure 3B:
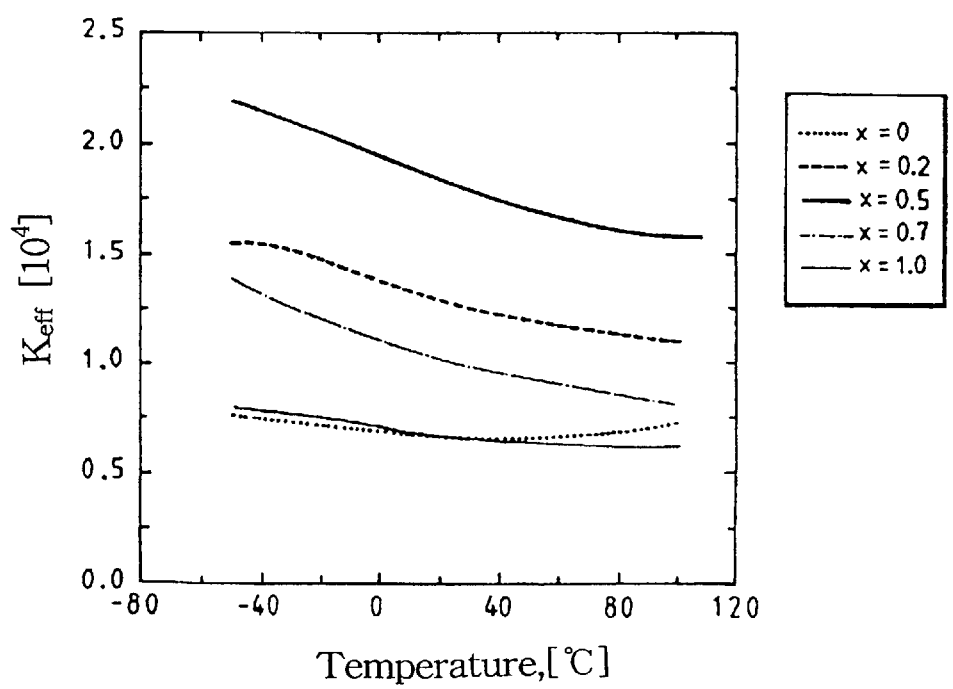
FIG. 3b is a graph in which the dielectric constant values of the $SrTiO_3$-based GBBLCs are plotted against temperature for various molar ratios of BaO and CaO when the infiltration treatment is conducted at 1,300° C. for 12 hours.

The same procedure as in Example I was repeated, except an increase in infiltration treatment time, from 4 hours to 8 hours and 12 hours. The resulting GBBLCs were measured for the dielectric constant change with temperature. The results are shown in FIG. 3. As shown in FIG. 3, the highest dielectric constant value is obtained when equal moles of BaO and CaO were infiltrated into the grain boundary. The dielectric constant is $2.2 \times 10^4$ when the infiltration treatment was carried out for 8 hours (FIG. 3a) and $1.8 \times 10^4$ when the infiltration treatment was carried out for 12 hours.

As described hereinbefore, the use of BaO and CaO in the infiltrating oxide liquid phase allows the $SrTiO_3$-based GBBLCs to have stable temperature characteristics with high dielectric constants. These GBBLCs fabricated according to the present invention can be widely used in the electronic component industry.

The present invention has been describe in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. An $SrTiO_3$-based grain boundary barrier layer capacitor, comprising an oxide melt which is infiltrated into the grain boundaries of a $SrTiO_3$ matrix, wherein said oxide melt contains BaO and CaO with a molar ratio ranging from 0.2CaO-0.8BaO to 0.7CaO-0.3BaO.

2. The $SrTiO_3$-based grain boundary barrier layer capacitor as set forth in claim 1, wherein the BaO and CaO are provided from a BaO precursor and a CaO precursor respectively.

* * * * *